PATENT

(12) United States Patent
Hayakawa et al.

(10) Patent No.: US 8,717,643 B2
(45) Date of Patent: May 6, 2014

(54) IMAGE READING APPARATUS

(75) Inventors: Mizuki Hayakawa, Kawasaki (JP); Atsushi Miyahara, Higashikurume (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 13/562,591

(22) Filed: Jul. 31, 2012

(65) Prior Publication Data

US 2012/0293848 A1 Nov. 22, 2012

Related U.S. Application Data

(63) Continuation of application No. 11/781,658, filed on Jul. 23, 2007, now Pat. No. 8,259,366.

(30) Foreign Application Priority Data

Jul. 28, 2006 (JP) ................................. 2006-205940
Jul. 28, 2006 (JP) ................................. 2006-205947

(51) Int. Cl.
 *H04N 1/04* (2006.01)
 *H04N 1/047* (2006.01)
 *H04N 1/00* (2006.01)
 *H04N 1/40* (2006.01)

(52) U.S. Cl.
 USPC ........... 358/497; 358/401; 358/494; 358/486; 358/474; 358/443; 382/312; 382/315

(58) Field of Classification Search
 None
 See application file for complete search history.

(56) References Cited

U.S. PATENT DOCUMENTS

| | | | | |
|---|---|---|---|---|
| 4,243,311 A * | 1/1981 | Tohyama et al. | ............. | 399/208 |
| 5,956,152 A * | 9/1999 | Yamada et al. | ............... | 358/412 |
| 6,189,395 B1 * | 2/2001 | Lee | ................. | 74/332 |
| 6,244,124 B1 * | 6/2001 | Lee | ................. | 74/354 |
| 6,366,343 B1 * | 4/2002 | Lee | ................. | 355/84 |
| 6,626,057 B1 * | 9/2003 | Fang | ................. | 74/354 |
| 8,259,366 B2 * | 9/2012 | Hayakawa et al. | ........... | 358/497 |
| 2003/0081271 A1 * | 5/2003 | Chien | ................. | 358/486 |
| 2003/0151780 A1 * | 8/2003 | Tsai | ................. | 358/474 |
| 2005/0150320 A1 * | 7/2005 | Chueh | ................. | 74/354 |
| 2005/0285327 A1 * | 12/2005 | Suzuki et al. | ................. | 271/109 |
| 2008/0101820 A1 * | 5/2008 | Hung | ................. | 399/211 |

FOREIGN PATENT DOCUMENTS

| | | | |
|---|---|---|---|
| JP | 1990-199368 A | 8/1990 |
| JP | 1990-289871 A | 11/1990 |
| JP | 1997-029565 A | 2/1997 |
| JP | 1999-064945 A | 3/1999 |
| JP | 2002-079422 A | 3/2002 |

\* cited by examiner

*Primary Examiner* — King Poon
*Assistant Examiner* — Beniyam Menberu
(74) *Attorney, Agent, or Firm* — Canon USA, Inc., I.P. Division

(57) ABSTRACT

An image reading apparatus includes a drive source, a speed change mechanism provided in a transmission unit that transmits a driving force from the drive source to a scanning drive unit. The speed change mechanism is configured to change a transmission ratio of the transmission unit by selectively bringing one of first and second couplings into a connected state. The image reading apparatus further includes a selector configured to selectively bring one of the first and second couplings into the connected state, a detector configured to detect the connected state of the second coupling, and a controller configured to control a scanning position of the reading unit based on the transmission ratio changed via the second coupling after the detector detects the connected state of the second coupling after the selector changes selection from the first coupling to the second coupling.

8 Claims, 9 Drawing Sheets

IMAGE READING APPARATUS

CROSS REFERENCE OF RELATED APPLICATIONS

This application is a continuation of U.S. application Ser. No. 11/781,658 filed Jul. 23, 2007 which claims the benefit of Japanese Application No. 2006-205940 filed Jul. 28, 2006 and No. 2006-205947 filed Jul. 28, 2006, each of which is hereby incorporated by reference herein in its entirety.

BACKGROUND OF THE INVENTION

1. Field of the Invention

The present invention relates to an image reading apparatus configured to read an image of a document placed on a document positioning plate and to a reading method therefor.

2. Description of the Related Art

FIG. 9 illustrates a configuration of a conventional color image reading apparatus.

A conventional image reading apparatus, such as the one discussed in Japanese Patent Application Laid-Open No. 2000-13564, reads an image of a document 96 by causing a reading unit 91 to scan the document 96 in parallel with a document positioning glass plate 94. The reading unit 91 includes a linear image sensor. A timing belt 93, which transmits power from a stepping motor 92 serving as a scanning drive source, is fixed to the reading unit 91.

Forward/reverse rotation of the stepping motor 92 enables the reading unit 91 to reciprocatingly scan an area of the document positioning glass plate 94. When reading an image of the document 96, the image reading apparatus drives the stepping motor 92 at a driving speed corresponding to a given resolution to cause the reading unit 91 to perform movement scan.

Generally, the minimum value of an exposure time needed to obtain information representing one line of the document 96 in reading an image of the document 96 is determined according to both the sensitivity of the image sensor and an amount of light received by the image sensor. The maximum value of a movement speed of the reading unit 91 can be determined according to the minimum value of the exposure time needed to obtain such information. When reading an image at low resolution, the reading unit 91 can set a movement speed at a high value. When reading an image at high resolution, it is necessary that the movement speed of the reading unit 91 is low. Actually, the upper limit of the movement speed is subject to various constrains, such as a time in which an electric signal is processed.

A stepping motor, which is useful for easy position control, is used to drive movement scan of the reading unit 91 of the image reading apparatus, and is required to rotate at a speed corresponding to a reading resolution. In a case where an image reading apparatus is being used in an electric power supply limited environment, e.g., where the image reading apparatus is USB (universal serial bus)-powered, the image reading apparatus may be unable to provide a desired reading speed range using a motor having a narrow speed range. Particularly, it is difficult within a range of a rotational speed of a single motor in a conventional high-resolution image reading apparatus to scan an image at reading speeds respectively corresponding to various resolutions. Accordingly, a speed change mechanism, such as a gear change, can be used. In a case where a driving force provided by a single drive source is transmitted using the speed change mechanism, such as a gear change, a state of gears varies during the gear change. Thus, the conventional image reading apparatus cannot accurately achieve position control according to the number of steps of a stepping motor.

SUMMARY OF THE INVENTION

According to an aspect of the present invention, an image reading apparatus configured to read an image of a document by causing a scanning drive unit to perform scanning drive of a reading unit includes a drive source, a speed change mechanism provided in a transmission unit that transmits a driving force from the drive source to the scanning drive unit and configured to change a transmission ratio of the transmission unit by selectively bringing one of first and second couplings into a connected state, a selector configured to selectively bring one of the first and second couplings into the connected state, a detector configured to detect the connected state of the second coupling, and a controller configured to control a scanning position of the reading unit by applying a drive control signal to the drive source. The controller starts controlling the scanning position of the reading unit based on the transmission ratio changed via the second coupling after the detector detects the connected state of the second coupling after the selector changes selection from the first coupling to the second coupling.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
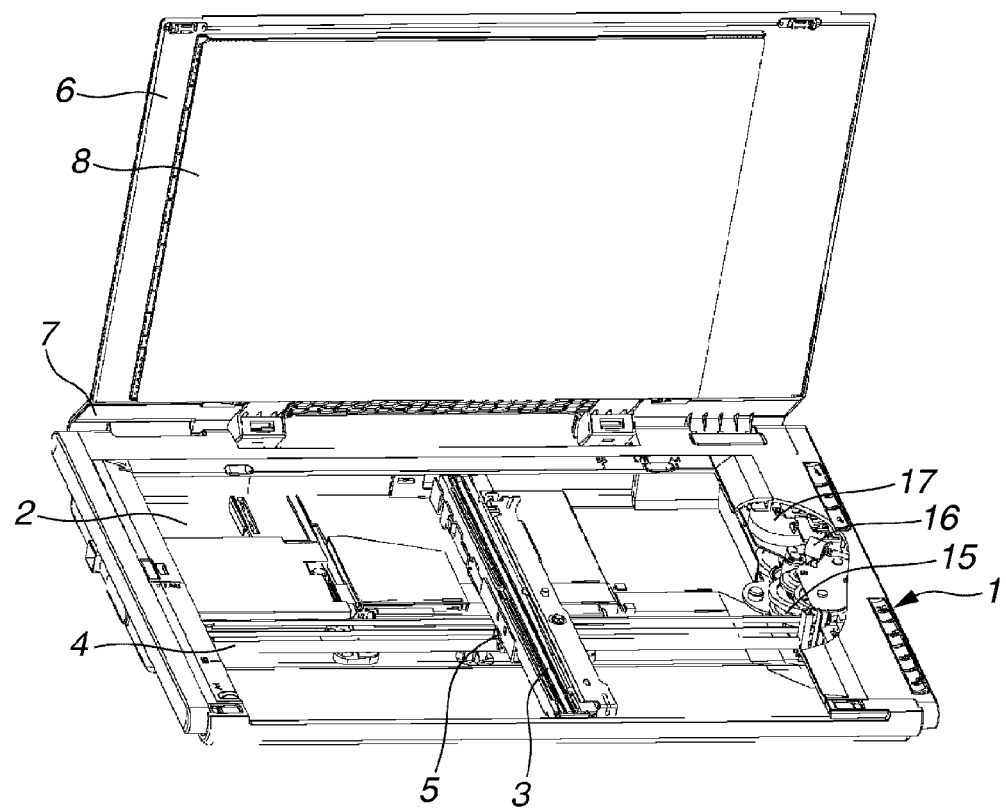
FIG. 1 is a perspective view illustrating an image reading apparatus according to an exemplary embodiment of the present invention in a state in which a document cover is opened.

FIG. 1 illustrates a configuration of a color image reading apparatus according to a first exemplary embodiment of the present invention. As illustrated in FIG. 1, a document is set on a document positioning glass plate 2 mounted on the top surface of an apparatus body 1. A contact image sensor 3 scans the document in parallel with the document positioning glass plate 2 and reads an image of the document. The contact image sensor 3 includes light-emitting diodes (LEDs) serving as light sources which illuminate a document and respectively correspond to three colors, a rod lens array which forms an image on a light receiving element of an image sensor from light reflected by the document, and the image sensor. The contact image sensor 3 constitutes a reading unit.

The contact image sensor 3 is supported on a carriage 5, which slides on a guide shaft 4 fixed to the apparatus body 1. A timing belt 15 is fixed to the carriage 5. The timing belt 15 serves as a scanning drive unit which transmits power from a stepping motor 17 serving as a drive source to the reading unit via a gear drive train 16 serving as a transmission unit. The gear drive train 16 includes a speed change mechanism with a gear change. A flexible cable (not shown) for inputting and outputting electric signals to and from the contact image sensor 3 is connected to the contact image sensor 3 at one end thereof and to a control board (not shown) of the apparatus body 1 at the other end thereof.

In addition to the above-described components, the image reading apparatus includes an electric equipment unit including a control board and a power supply, as constituent elements. These constituent elements are disposed in the apparatus body 1, which fixedly supports the document positioning glass plate 2.

A document cover 6 serving as a cover member for pressing a document onto the document positioning glass plate 2 is openably and closably attached to the apparatus body 1 via a hinge 7. A document pressing sheet 8 is pasted to an inner surface of the document cover 6, which faces the document positioning glass plate 2.

Figure 2:
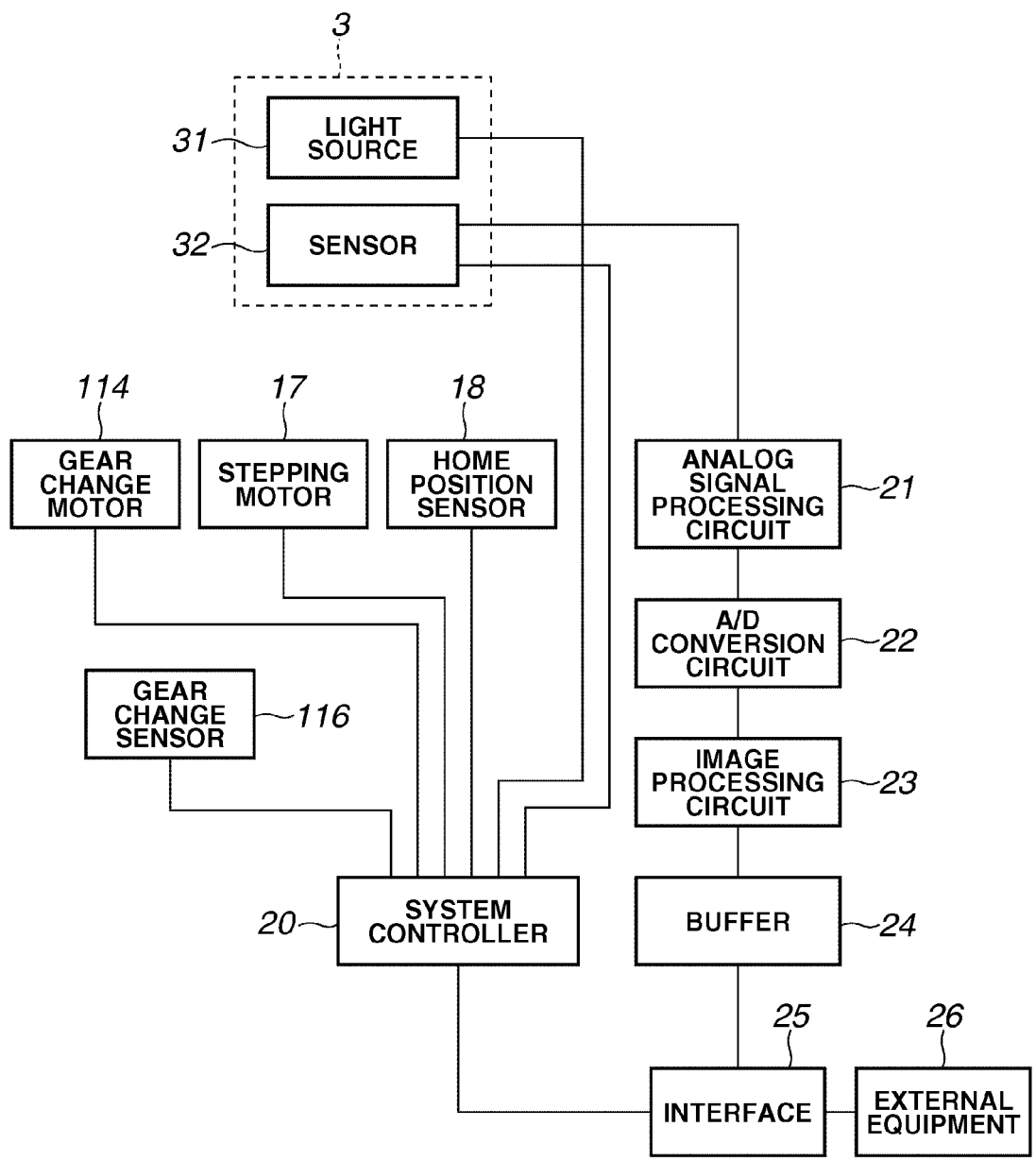
FIG. 2 is a block diagram of an image reading apparatus according to an exemplary embodiment of the present invention.

FIG. 2 illustrates an electrical configuration of the image reading apparatus according to an exemplary embodiment. The contact image sensor 3 includes a light source 31, serving as a reflective-document illuminating light source, and an image sensor 32. A home position sensor 18 connected to a system controller 20 is used to adjust an initial position of the stepping motor 17, which performs scanning drive of the carriage 5. The system controller 20 controls the light source 31.

The system controller 20 also controls the image sensor 32. An analog signal processing circuit 21 processes an output signal from the image sensor 32. An A/D conversion circuit 22 converts the processed output signal into a digital signal. An image processing circuit 23 processes the digital signal. A buffer memory 24 stores the processed digital signal. The system controller 20, the buffer memory 24, and an interface 25 are connected to one another and can perform data communication there among. The signal stored in the buffer memory 24 can be sent, as data image, to an external equipment 26 via the interface 25. The system controller 20 is also connected to and controls the stepping motor 17, a gear change motor 114, and a gear change sensor 116. The gear change sensor 116 detects a connected state of the gear drive train. The system controller 20 controls the position of the carriage 5 with the stepping motor 17.

The gear drive train 16 (shown in FIG. 1), serving as a transmission unit, is described with reference to FIGS. 3 to 6.

The gear drive train 16 changes over between two couplings serving as a speed change mechanism.

A speed reduction ratio is defined as the ratio of the number of revolutions of a pulley 107c driving the timing belt 15 to the number of revolutions of the stepping motor 17. The speed reduction ratio for low-resolution reading with high-speed movement of the reading unit is "1/15". The speed reduction ratio for high-resolution reading with low-speed movement of the reading unit is "1/60". These ratios are transmission ratios at which a driving force is transmitted from the stepping motor 17 to the reading unit to perform movement scan. That is, an advancing amount of the carriage 5 generated by a low-resolution purpose gear drive train and corresponding to one pulse applied to the stepping motor 17 is equal to that of the carriage 5 generated by a high-resolution purpose gear drive train and corresponding to four pulses applied to the stepping motor 17. Therefore, the high-resolution purpose gear drive train enables the reading unit to read an image in a movement direction of the carriage 5 four times finer than the low-resolution purpose gear drive train.

An exemplary embodiment assumes that the reading unit reads an image with 4800 scanning lines per inch at a maximum. Accordingly, a movement distance of the carriage 5 generated by the high-resolution purpose gear drive train and corresponding to one pulse applied to the stepping motor 17 is equal to the length of one pixel in the case of reading an image at a resolution of 4800 dpi. In the case of using this gear drive train, two pulses applied to the stepping motor 17 correspond to a resolution of 2400 dpi. Three pulses applied to the stepping motor 17 correspond to a resolution of 1600 dpi.

A gear ratio of the low-resolution purpose gear drive train corresponding to a small speed reduction ratio is 1/4 times that of the high-resolution purpose gear drive train corresponding to a large speed reduction ratio. A movement distance of the carriage 5 generated by the low-resolution purpose gear drive train and corresponding to one pulse applied to the stepping motor 17 is equal to the length of one pixel in the case of reading an image at a resolution of 1200 dpi.

Figure 3:
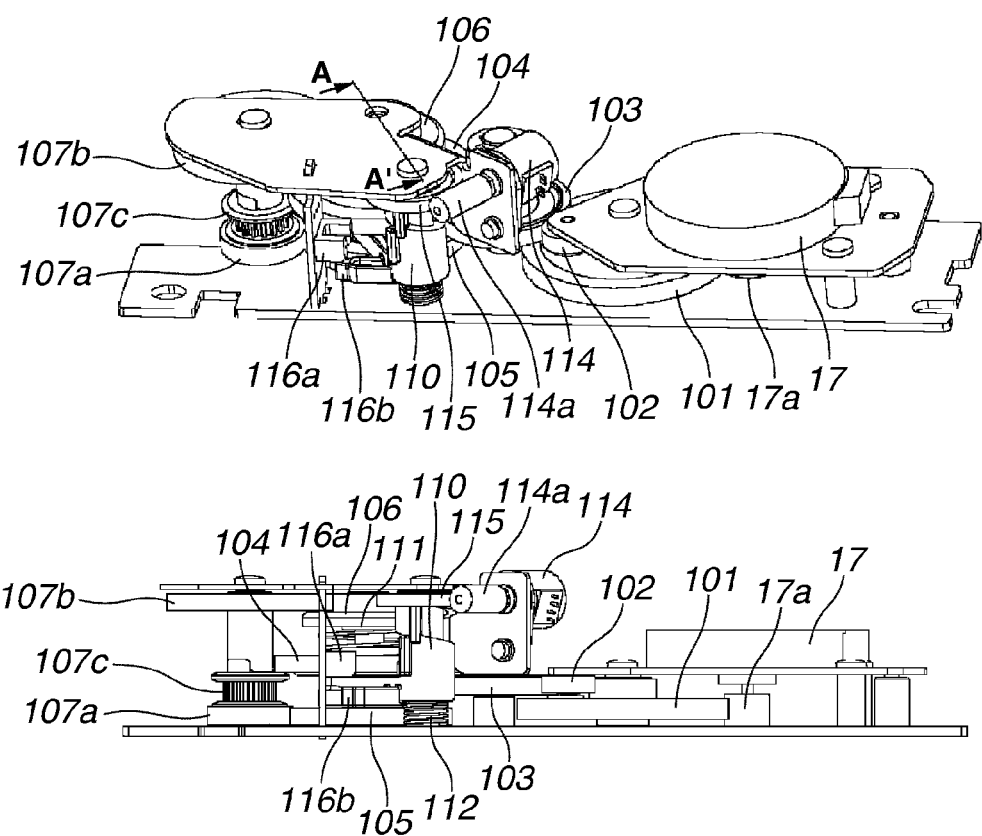
FIG. 3 illustrates a state in which a gear drive train having a small speed reduction ratio is selected.
Figure 4:
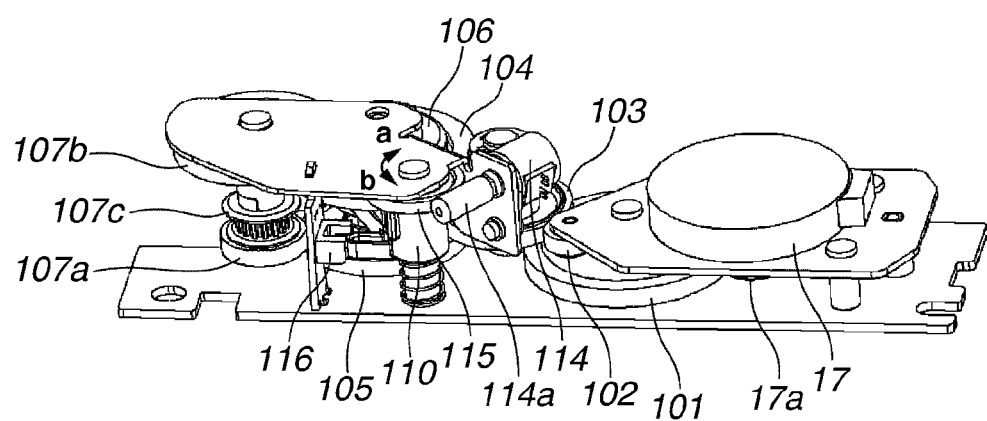
FIG. 4 illustrates a state in which a gear drive train having a large speed reduction ratio is selected.
Figure 4:
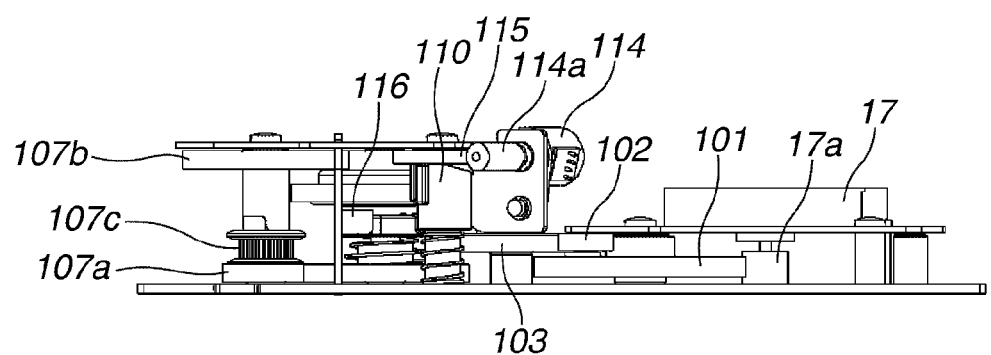
Figure 5:
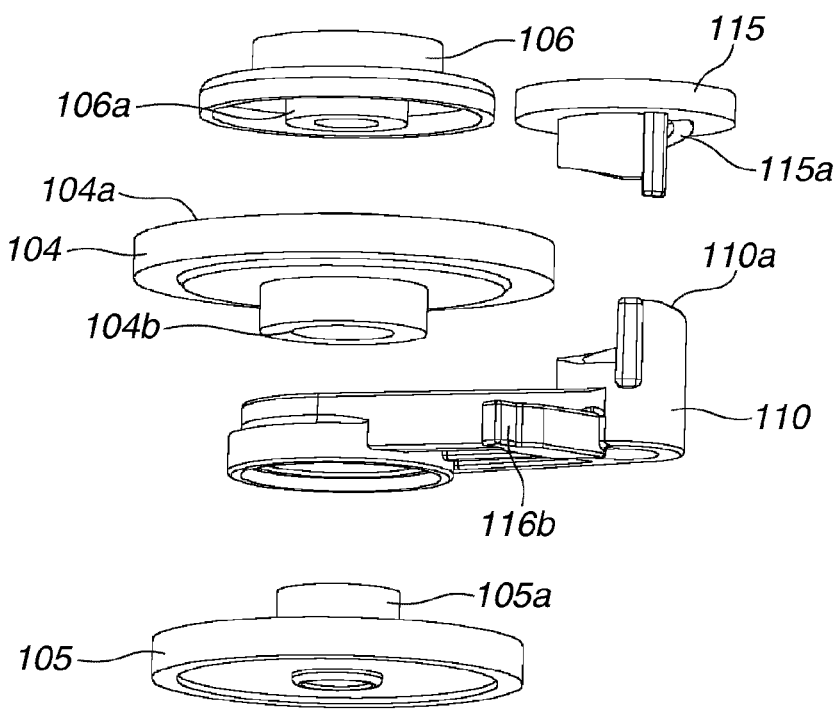
FIG. 5 illustrates a configuration of a gear drive train according to an exemplary embodiment of the present invention.
Figure 6:
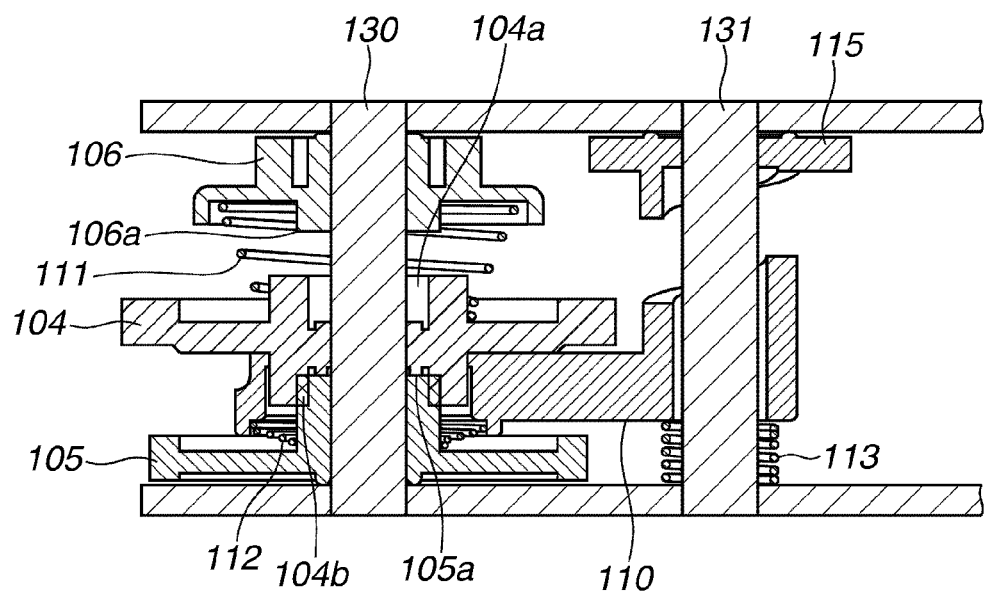
FIG. 6 is a cross-sectional view of a speed change mechanism according to an exemplary embodiment of the present invention.

FIGS. 3 to 5 illustrate the gear drive train according to an embodiment. FIG. 6 illustrates a cross-section taken along line A-A' shown in FIG. 3.

The small-speed-reduction-ratio gear drive train includes a drive gear 17a attached to the stepping motor 17, a gear 101, an idler gear 102, a gear 103, a gear 104, a gear 105, and a gear 107a. The large-speed-reduction-ratio gear drive train includes gears 106 and 107b in addition to the drive gear 17a and the gears 101 to 104.

These gear drive trains differ from each other in the gear ratio of the final stage. The gear ratio between the gears 105 and 107a is "2". The gear ratio between the gears 106 and 107b is "1/2".

The gears 104, 105, and 106 are coaxial with a shaft 130. The gear 104 always meshes with the gear 103 and can move axially (i.e., upward and downward, as viewed in FIG. 6). A small-diameter gear of the gear 103 has a thickness corresponding to an axial movement distance of the gear 104. The gears 105 and 106 are fixed in axial position. The gears 105 and 106 always mesh with the gears 107a and 107b, respectively.

As illustrated in FIG. 6, coupling portions 104a and 106a of a coupling are provided on the top surface of the gear 104 and the bottom surface of the gear 106, respectively, to connect the gears 104 and 106 to each other. Similarly, coupling portions 104b and 105a of another coupling are provided on the bottom surface of the gear 104 and the top surface of the gear 105, respectively, to connect the gears 104 and 105 to each other. A shaft of the gear 104 serves as an output shaft that selectively transmits a driving force from the stepping motor 17 to one of the two couplings.

Each of the couplings according to an exemplary embodiment includes an internal gear and a spur gear, which are equal to each other in the number of teeth. The gears 104a and 104b are internal gears, and the gears 105a and 106a are spur gears, whose tooth shapes are not shown. The spur gear can be inserted into the internal gear, so that these gears mesh with each other to connect associated components to each other.

A change arm 110 is located between the gears 104 and 105 coaxially with the shaft 130. A spring 111 presses the gear 104 against the change arm 110. A spring 112 pushes the change arm upward as viewed in FIG. 6. A spring 113 always presses the change arm 110 against a gear change wheel 115 along a shaft 131.

In a free state, a resultant of forces of the springs 112 and 113 is greater than a force of the spring 111. Thus, the gears 104 and 106 are connected to each other at the coupling portions 104a and 106a.

Cam surfaces 110a and 115a are respectively provided on a surface of the change arm 110 and a surface of the gear change wheel 115, against which the change arm 110 is pressed. When a gear change motor 114 is driven, a gear change worm gear 114a serving as a drive gear attached to the gear change motor 114 rotates the gear change wheel 115. Then, the gear change wheel 115 lowers the cam surface 110a, with which the spiral cam surface 115a engages, to change the height of the change arm 110. A selector having such a configuration can select a rotation direction of the gear change motor 114 to select one of the couplings so that the coupling portions of the selected coupling are connected to each other. The spring 111 presses the gear 104 downward as viewed in FIG. 6 against the change arm 110. Thus, as the change arm 110 moves, the gear 104 moves downward as viewed in FIG. 6. In a case illustrated in FIG. 3, the coupling portion 104b of the gear 104 is connected to the coupling portion 105a of the gear 105 in a state in which the change arm 110 and the gear 104 are placed at an axially lower side of the shaft 130, as viewed in FIG. 6. Thus, a small-speed-reduction-ratio gear drive train is selected. In a case illustrated in FIG. 4, the coupling portion 104a of the gear 104 is connected to the coupling portion 106a of the gear 106 in a state in which the change arm 110 and the gear 104 are placed at an axially upper side of the shaft 130, as viewed in FIG. 6. Thus, a large-speed-reduction-ratio gear drive train is selected.

The gear change sensor 116 can detect the axial position of the change arm 110. The gear change sensor 116 serves as a detector that detects a gear change. When the coupling portion 104a of the gear 104 and the coupling portion 106a of the gear 106 are connected to each other, a light-blocking plate 116a mounted on the change arm 110 blocks light from entering a photointerrupter 116b mounted on a fixed portion.

The gears 107a, 107b, and the pulley 107c are connected together and rotate forward and backward as one body. The timing belt 15 is attached to the pulley 107c. Thus, a scanning drive unit is constituted, which transmits the rotation of the pulley 107c to the carriage 5. Consequently, the scanning drive unit transmits to the reading unit a driving force output from the stepping motor 17 to perform the scanning drive of the reading unit.

A transition from a state in which the transmission unit operates with the small-speed-reduction-ratio gear drive train to another state in which the transmission unit operates with the large-speed-reduction-ratio gear drive train is described below. In the state in which the transmission unit operates with the small-speed-reduction-ratio gear drive train, the coupling portions 104b and 105a are connected to each other. Power from the gear 104 is transmitted to the gear 105. At that time, the photointerrupter 116b of the gear change sensor 116 is not light-blocked 1) First, the home position of the carriage 5 is detected. A counter provided in the system controller 20 to control the stepping motor 17 is initialized. Consequently, the scanning position of the reading unit can be initialized. The home position is located upstream in a reading/scanning direction in which reading/scanning of a document is performed. The home position is detected while the carriage 5 is moved in the reading/scanning direction during the forward rotation of the stepping motor 17.

2) Next, the carriage 5 is moved to an immediate front of a reading start position with the small-speed-reduction-ratio gear drive train. Then, the stepping motor 17 is stopped.

3) In order to select the large-speed-reduction-ratio gear drive train, the gear change motor 114 is caused to perform forward rotation. Thus, the gear change wheel 115 rotates in the direction of arrow "b" shown in FIG. 4. Consequently, engaging surface parts of the spiral cam surface 115a and the cam surface 110a, which engage with each other, are gradually slid away from each other. Accordingly, the change arm 110 moves upward as viewed in FIG. 6. Also, the gear 104 moves axially upward as viewed in FIG. 6. As the gear 104 moves, the coupling portions 104b and 105a are disconnected.

4) When the gear change wheel 115 is further rotated in the direction of arrow "b", the top surface of the coupling portion 104a collides with the bottom surface of the coupling portion 106a. In a case where the gear teeth are in phase, the coupling portions 104a and 106a are well connected to each other. However, usually, the gear teeth are out of phase, so that the top surface of the coupling portion 104a collides with the bottom surface of the coupling portion 106a.

5) In a case where the gear teeth are in phase, the gear change wheel 115 is further rotated in the same direction to an angular position so that the coupling portions 104a and 106a are well connected to each other. However, usually, the gear teeth are out of phase, the engaging surface parts of the spiral cam surface 115a and the cam surface 110a are disengaged from each other. Thus, the cam surface 115a disengages upward from the cam surface 110a. Conversely, in a case where the gear teeth are in phase, the photointerrupter 116b of the gear change sensor 116 is light-blocked. Thus, a gear change to the large-speed-reduction-ratio gear drive train is detected. Consequently, the gear change is finished.

6) In a case where the gear change sensor 116 can detect no gear change, the top surface of the coupling portion 104a collides with the bottom surface of the coupling portion 106a. The gear 104 is upward pushed via the change arm 110 by an upward resultant of forces of the springs 112 and 113, which is larger than the downward force of the spring 111. Then, the forward rotation of the stepping motor 17 is resumed.

7) The coupling portion 104a rotates in a state in which the top surface of the coupling portion 104a is in contact with the bottom surface of the coupling portion 106a. When the gear teeth become in phase, the gear 104 moves upward. The gear 104 is thus connected by the coupling portions 104a and 106a to the gear 106, which serves as a first transmission gear. At that time, the gear change sensor 116 detects a gear change. Thus, the gear change is finished.

Subsequently, the rotation of the stepping motor 17 is transmitted to the pulley 107c via the gears 106 and 107b. At that time, the gear 107a rotating together with the gear 107b and the pulley 107c as one body causes the gear 105 to run idle.

Conversely, in order to select the small-speed-reduction-ratio gear drive train, first, the rotation of the stepping motor 17 is stopped. Next, the gear change motor 114 is rotated backward. Thus, the gear change wheel 115 rotates in the direction of arrow "a" shown in FIG. 4. Consequently, when the change arm 110 moves downward as viewed in FIG. 6, a force of the spring 111 causes the gear 104 to move axially downward as viewed in FIG. 6. Accordingly, the coupling portions 104a and 106a are disengaged from each other. At that time, the photointerrupter 116b of the gear change sensor 116 is unshielded from light. However, the coupling portions 104b and 105a are not yet connected to each other. When the gear change wheel 115 further rotates in the direction of arrow "a" shown in FIG. 4, the change arm 110 moves downward. Usually, the gear teeth are out of phase, so that the bottom surface of the coupling portion 104a collides with the top surface of the coupling portion 105a. When the gear change wheel 115 further rotates in the direction of arrow "a" shown in FIG. 4, the change arm 110 moves downward to a position at which the coupling portions 104b and 105a can fully be connected to each other in a case where the gear teeth are in phase. Subsequently, when the stepping motor 17 is caused to run, the coupling portion 104a rotates in a state in which the bottom surface of the coupling portion 104b is in contact with the top surface of the coupling portion 105a. When the gear teeth become in phase, a force of the spring 111 causes the gear 104 to move downward, so that the coupling portions 104b and 105a are connected to each other. Subsequently, the rotation of the stepping motor 17 is transmitted to the pulley 107c via the gear 105 and the gear 107a. At that time, the gear 107b rotating together with the gear 107a and the pulley 107c as one body causes the gear 106 to run idle.

As described above, the axial position of the gear 104 can be changed by changing the axial position of the change arm 110. The two gear drive trains can selectively be used by changing the axial position of the gear 104.

Next, an operation of the image reading apparatus for reading a document at a high resolution and an operation of the image reading apparatus for reading a document at a low resolution according to an exemplary embodiment are described below.

First, an operation of the image reading apparatus for reading a document at a low resolution is described.

The carriage 5 is placed at an initial position. Then, the gear change sensor 116 confirms that the gear 104 is connected to the gear 105. Subsequently, the stepping motor 17 is driven to move the carriage 5 from the initial position to the reading start position. The carriage 5 can be moved at high speed to the reading start position. Accordingly, the low resolution purpose gear drive train corresponding to a small speed reduction ratio is used. Then, reading of a document is started using the low resolution purpose gear drive train corresponding to a small speed reduction ratio. Upon completion of reading the document, the stepping motor 17 is rotated backward while the low resolution purpose gear drive train remains selected. Thus, the carriage 5 is moved to the initial position.

Next, an operation of the image reading apparatus for reading a document at a high resolution is described.

First, the carriage 5 is placed at an initial position. Then, the gear change sensor 116 confirms that the gear 104 is connected to the gear 105. Subsequently, the stepping motor 17 is driven to move the carriage 5 from the initial position to the reading start position. At that time, the low resolution purpose gear drive train corresponding to a small speed reduction ratio is used, similar to the case of reading a document at a low resolution.

Subsequently, the stepping motor 17 is caused to rotate forward. When the carriage 5 reaches the reading start position, the stepping motor 17 is temporarily stopped.

Subsequently, the gear change motor 114 is rotated backward until the gear change sensor 116 confirms that the gear 104 is connected to the gear 106. The gear change wheel 115 is rotated in the direction of arrow "b" shown in FIG. 4. Consequently, the change arm 110 moves upward as viewed in FIG. 6. In synchronization with this movement, the gear 104 is moved axially upward as viewed in FIG. 6. Then, the gear 104 is disconnected from the gear 105 and is connected to the gear 106. Subsequently, the stepping motor 17 is driven to start reading the document at a high resolution. Upon completion of reading the document, the gear 104 is switched to the position corresponding to the low resolution purpose gear drive train. Then, the stepping motor 17 is rotated backward to move the carriage 5 to the initial position.

Figure 7:
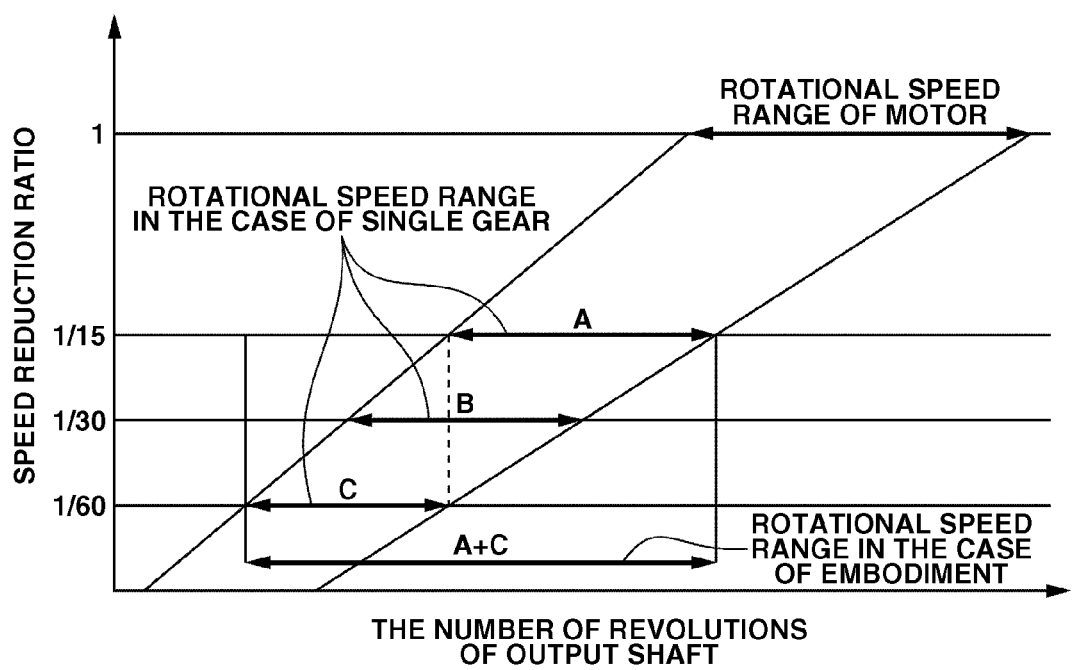
FIG. 7 illustrates rotational speed ranges respectively provided by gear drive trains corresponding to different speed reduction ratios.

FIG. 7 illustrates rotational speed ranges respectively provided by the gear drive trains corresponding to different speed reduction ratios. As is understood from FIG. 7, according to an exemplary embodiment, a speed range "A" provided by the gear drive train corresponding to a speed reduction ratio of "1/15" and a speed range "C" provided by the gear drive train corresponding to a speed reduction ratio of "1/60" can be selectively used. Accordingly, an available speed range "A+C" is a combination of the ranges "A" and "C". In contrast, a conventional apparatus employing a single gear drive train corresponding to a speed reduction ratio of, e.g., "1/30", which is intermediate in value between "1/15" and "1/60", provides a very narrow speed range.

Second Exemplary Embodiment

Next, an image reading apparatus according to a second exemplary embodiment is described below.

The image reading apparatus according to the second exemplary embodiment is configured such that the when a low resolution purpose gear drive train is changed to a high resolution purpose gear drive train, the low resolution purpose gear drive train remains connected to the stepping motor 17 until the high resolution purpose gear drive train is connected thereto. Thus, when the stepping motor 17 is driven, the carriage 5 is moved even before the high resolution purpose gear drive train is connected to the stepping motor 17 after the change from the low resolution purpose gear drive train to the high resolution purpose gear drive train is selected. The rest of the second exemplary embodiment is similar to the first exemplary embodiment.

Figure 8:
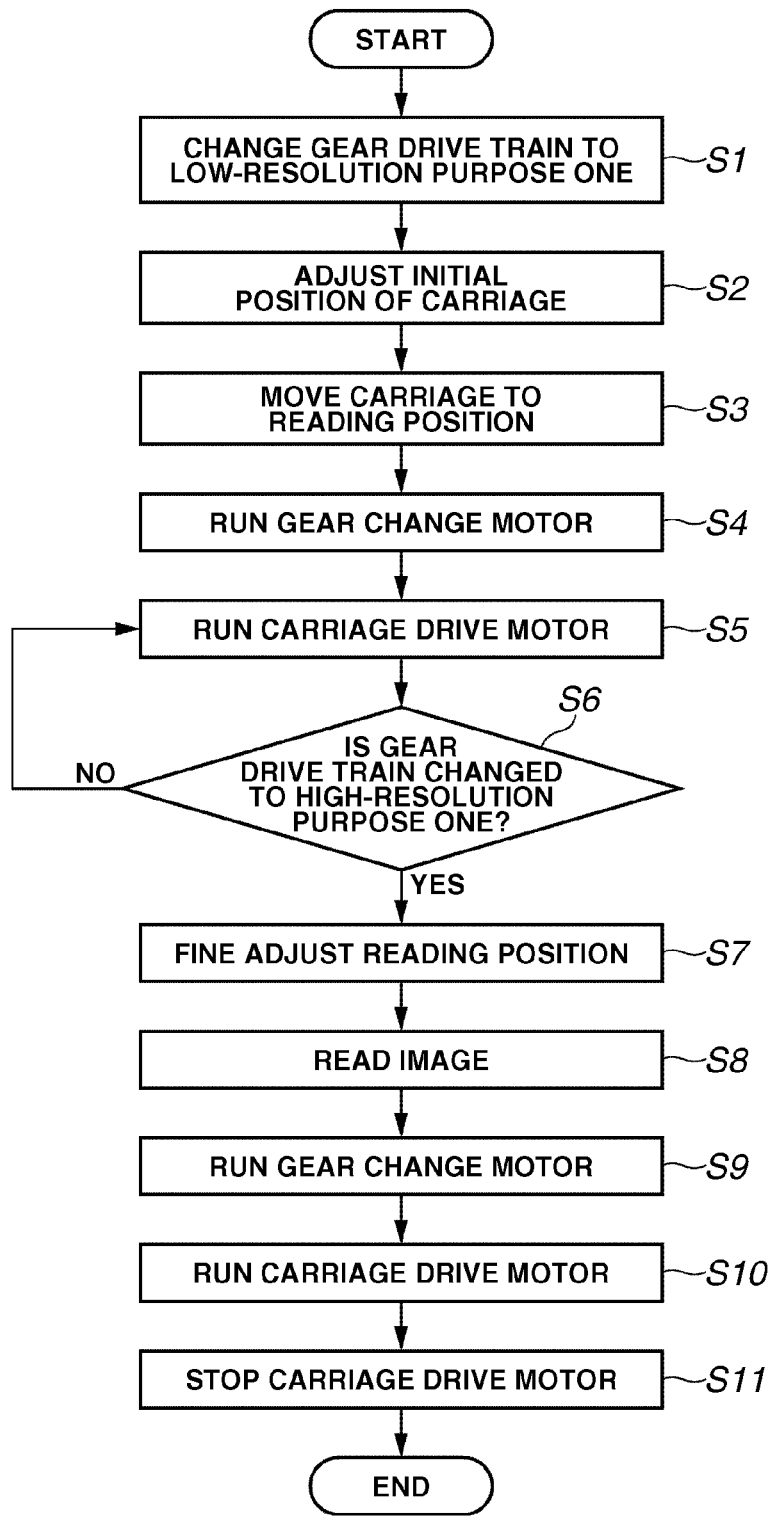
FIG. 8 is a flowchart illustrating an operation of an image reading apparatus according to an exemplary embodiment of the present invention.
Figure 9:
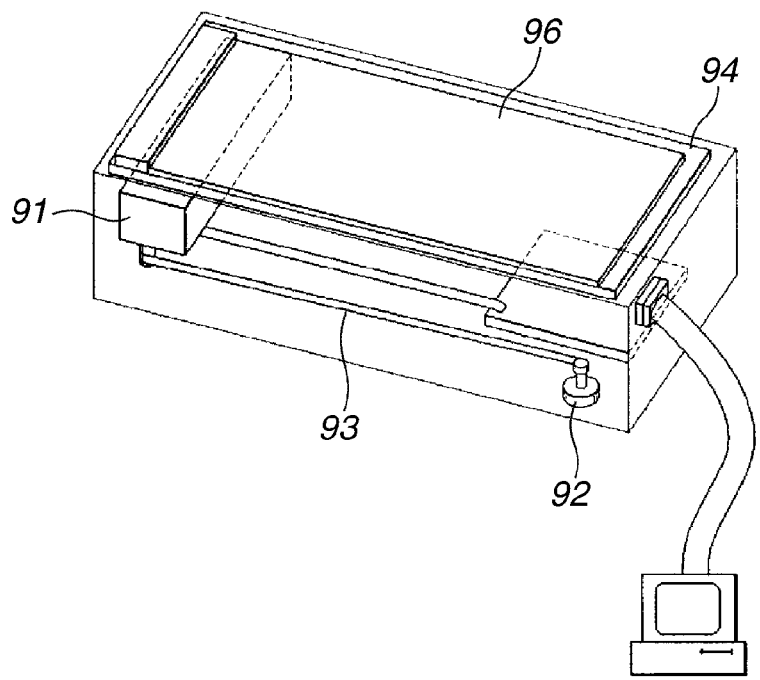
FIG. 9 illustrates a conventional image reading apparatus.

An operation of the image reading apparatus according to the second exemplary embodiment is described below with reference to a flowchart illustrated in FIG. 8.

In step S1, the system controller 20 causes the gear change sensor 116 to determine which of the high resolution purpose gear drive train and the low resolution purpose gear drive train is connected to the stepping motor 17. If the high resolution purpose gear drive train is connected to the stepping motor 17, the gear change motor 114 is run to change the gear drive train to be connected to the stepping motor 17 from the high resolution purpose gear drive train to the low resolution purpose gear drive train.

In step S2, the system controller 20 causes the home position sensor 18 to detect the initial position of the carriage 5. Then, the system controller 20 adjusts the initial position to perform position control.

In step S3, the system controller 20 moves the carriage 5 to a gear change position which is located at a front of a reading position. In consideration of a distance L by which the carriage 5 is moved during a gear change, the carriage 5 is moved to the front of the reading position rather than being moved just to the reading position.

In step S4, the system controller 20 runs the gear change motor 114 to change the gear drive train to be connected to the stepping motor 17 from the low resolution purpose gear drive train to the high resolution purpose gear drive train.

In step S5, the system controller 20 causes the stepping motor 17 (carriage drive motor) to rotate by an angle corresponding to a minute step.

In step S6, the system controller 20 causes the gear change sensor 116 to determine whether the high resolution purpose gear drive train is connected to the stepping motor 17. If the high resolution purpose gear drive train is connected to the stepping motor 17 (YES in step S6), the system controller 20 advances to step S7. Otherwise (NO in step S6), the system controller 20 returns to step S5.

In step S7, the system controller 20 can determine a distance, by which the carriage 5 has moved to perform the gear change, according to the number of times of performing step drive in step S5. The carriage 5 has been stopped at the distance L in front of the reading position in step S3. Thus, the remaining distance to the reading position can be obtained by subtracting a distance, by which the carriage 5 has moved in step S5, from the distance L. Consequently, the system controller 20 controls the number of pulses serving as a drive control signal for driving the stepping motor 17, so that the carriage 5 moves the remaining distance.

In step S8, the system controller 20 reads an image.

In step S9, the system controller 20 runs the gear change motor 114 to change the gear drive train to be connected to the stepping motor 17 from the high resolution purpose gear drive train to the low resolution purpose gear drive train.

In step S10, the system controller 20 runs the stepping motor 17 (carriage drive motor) to move the carriage 5 to the initial position. When the stepping motor 17 starts rotating, the gear drive train to be connected to the stepping motor 17 is changed from the high resolution purpose gear drive train to the low resolution purpose gear drive train.

In step S11, the system controller 20 decelerates and stops the stepping motor 17 when the home position sensor 18 detects the home position of the carriage 5.

In an exemplary embodiment of the present invention, the stepping motor 17 can be replaced with a direct current (DC) motor with a rotary encoder. In this case, the drive control of the DC motor is performed according to output pulses from the rotary encoder.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image reading apparatus configured to read an image of a document by causing a scanning drive unit to perform scanning drive of a reading unit, the image reading apparatus comprising:
   a first drive source;
   a second drive source;
   a transmission unit that transmits a driving force from the first drive source to the scanning drive unit, wherein the transmission unit has a first coupling configured to transmit the driving force from the first drive source to the scanning drive unit with a first speed reduction ratio, a second coupling configured to transmit the driving force from the first drive source to the scanning drive unit with a second speed reduction ratio being larger than the first speed reduction ratio, and a selector which is movable, by the second driving source, between a first position at which the selector connects to the first coupling and a second position at which the selector connects to the second coupling;
   a detector configured to detect that the selector connects to the second coupling; and
   a controller configured to control driving of the second drive source so as to move the selector from the first position to the second position with the reading unit being stopped at a predetermined position and subsequently cause the first drive source to repeat driving in increments of a predetermined amount until it is detected by the detector that the selector connects to the second coupling.

2. The image reading apparatus according to claim 1, wherein the first coupling corresponds to a low-resolution reading of the reading unit and the second coupling corresponds to a high-resolution reading of the reading unit.

3. The image reading apparatus according to claim 1, wherein at the predetermined position is a reading start position or at a position near the reading start position.

4. The image reading apparatus according to claim 1, wherein the controller determines, based on a driving amount of the first drive source, a distance from the predetermined position to the reading start position.

5. The image reading apparatus according to claim 1, wherein the detector has a light-blocking plate and a photo-interrupter, the light-blocking plate being mounted on the selector and the photo-interrupter being mounted on a fixed portion.

6. The image reading apparatus according to claim 1, wherein the reading unit comprises an image sensor.

7. The image reading apparatus according to claim 1, wherein the first drive source comprises at least one of a stepping motor and a direct current motor.

8. The image reading apparatus according to claim 1, wherein the second drive source comprises a motor.

* * * * *